March 18, 1958  E. McDONALD  2,826,806
CLUSTER GEAR ASSEMBLING TOOL
Filed Oct. 28, 1953

INVENTOR.
Earl McDonald
BY Victor J. Evans & Co.
ATTORNEYS

United States Patent Office 2,826,806
Patented Mar. 18, 1958

2,826,806

CLUSTER GEAR ASSEMBLING TOOL

Earl McDonald, San Pablo, Calif., assignor of one-fourth to Lou Tatom and one-fourth to K. D. Tatom, both of Carter, Okla.

Application October 28, 1953, Serial No. 388,835

1 Claim. (Cl. 29—271)

This invention relates to a tool, and more particularly to a tool for use in assembling the cluster gears of vehicle transmissions.

The object of the invention is to provide a tool which will facilitate the placing or assembling of cluster gears in the transmissions of various vehicles such as trucks and automobiles.

Another object of the invention is to provide a tool for use in assembling the cluster gear, needle bearings, and washers that go with the cluster gears in the transmissions of automobiles, trucks and other vehicles.

A further object of the invention is to provide a cluster gear assembly tool which is extremely simple and inexpensive to manufacture.

Other objects and advantages will be apparent during the course of the following description.

In the accompanying drawings, forming a part of this application, and in which like numerals are used to designate like parts throughout the same:

Figure 1:
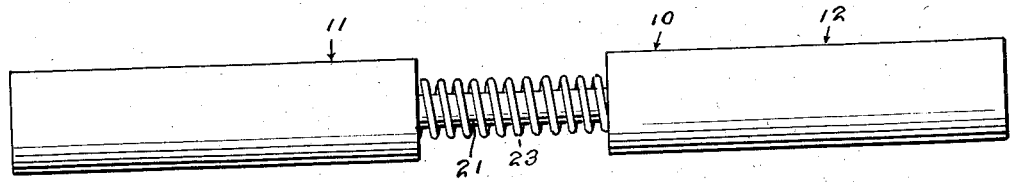
Figure 1 is a side elevational view of the tool of the present invention.
Figure 2:
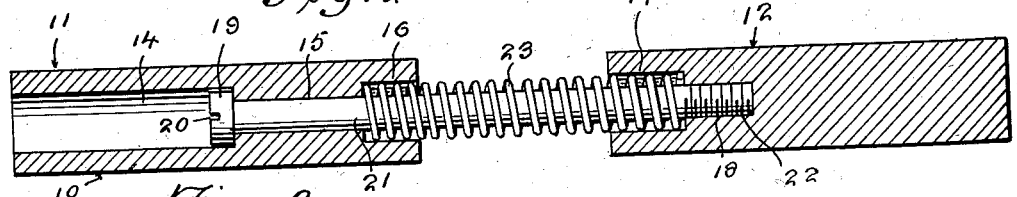
Figure 2 is a longitudinal sectional view taken through the tool.

Referring in detail to the drawings, the numeral 10 designates the tool of the present invention, and the tool 10 includes a body member 11 and a support member 12. Each of the members 11 and 12 may be cylindrical in shape, and the body member 11 is provided with an inwardly extending chamber 14, there being a bore 15 communicating with the chamber 14. The bore 15 communicates with a socket 16 which extends inwardly from an end of the body member 11.

The support member 12 is provided with a cut-out 17 which communicates with a threaded recess 18 for a purpose to be later described.

A pin or bolt has a head 19 seated in the chamber 14, and the head 19 is provided with a slit or kerf 20 whereby a suitable tool such as a screw driver can be arranged in engagement with the pin for rotating the latter when the device of the present invention is being assembled. The pin further includes a shank or cylindrical stem 21 which extends from the head 19 through the bore 15, and through the socket 16. The shank 21 slidably extends through the bore 15 and the shank 21 also extends through the cut-out 17 and includes a threaded portion 22 which threadedly engages the recess 18. A coil spring 23 is circumposed on the shank 21, and the coil spring 23 has one end seated in the cut-out 17 and its other end seated in the socket 16, the coil spring 23 normally serving to urge the body member 11 and support member 12 away from each other.

The numeral 24 designates a portion of a transmission which may be the transmission of an automobile, truck, or other vehicle, and the transmission 24 includes the usual case 25. The tool of the present invention serves to facilitate the placement of the cluster gear 26 within the case 25 and the tool of the present invention also facilitates the placement of the cluster gear washers and needle bearings in their proper aligned places in the transmission 24. The case 25 is provided with the usual pair of registering openings 27 and 28, and the shaft 29 is adapted to extend through the registering openings 27 and 28, and also through registering openings in the cluster gear when the transmission is in its final assembled form.

Figure 3:
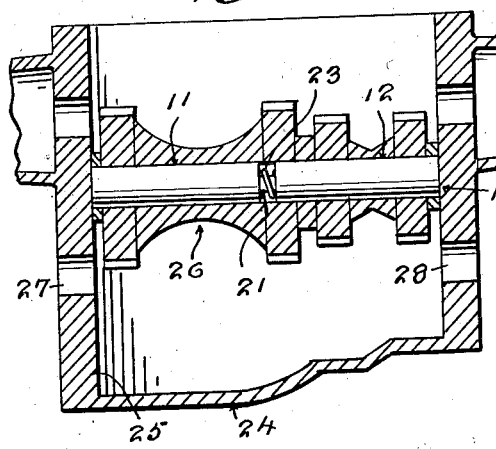
Figure 3 is a sectional view taken through a vehicle transmission and showing the tool being used for placing the gears in the transmission case.
Figure 4:
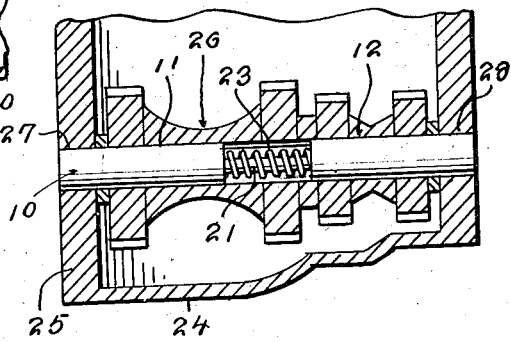
Figure 4 is a view similar to Figure 3, but showing the tool in registry with the openings in the transmission case.
Figure 5:
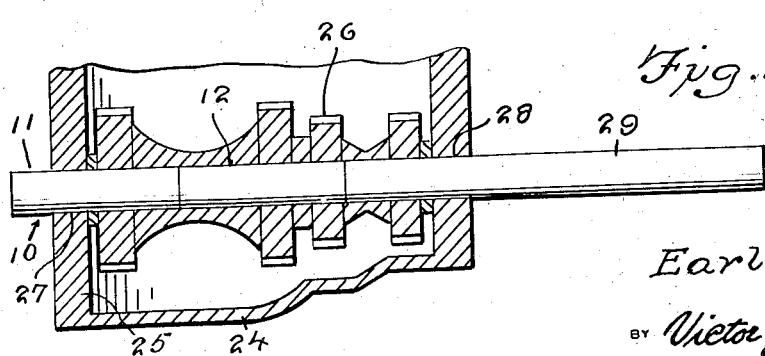
Figure 5 is a view similar to Figures 3 and 4 but showing the regular shaft being used to displace the tool or dummy shaft in the transmission.

From the foregoing it is apparent that a tool has been provided which will facilitate the placement of cluster gears such as the cluster gear 26 in the transmission 24. In use the tool is compressed so that the body member 11 and support member 12 are moved towards each other to compress the spring 23 whereby the tool can be inserted through the cluster gear. Then with the tool 10 still compressed, the cluster gear with the tool therein is placed within the case 25 as shown in Figure 3. Then the parts are moved down in the transmission case to the position shown in Figure 4 so that the tool registers with the openings 27 and 28 whereby the spring 23 will force the body member 11 and support member 12 apart so that these members engage the openings 27 and 28. Then, the regular or motor shaft 29 can be pushed through the opening 28, and into engagement with the end of the tool 10 to displace the tool from the interior of the cluster gear and force the tool out through the other opening 27. This movement is shown in Figure 5 and the shaft 29 can finally be pushed far enough through the transmission case to entirely displace the tool 10 so that the tool 10 can be used in subsequent gear assembly operations.

The tool of the present invention can be used for assembling the cluster gear, needle bearings and washer that go with the cluster gears of transmissions of vehicles such as automobiles and trucks. The tools can be made in any size, and as previously stated when the tool is being used it is slipped through the cluster gear and bearings and washers and the cluster gear assembly is placed in the case 25 by holding the ends of the tool compressed enough to permit the tool to slip down into the case in its proper place. Then, when the cluster gear shaft 29 is to be positioned in the transmission, it can be slipped through the opening 28 or through the opening 27 and during this operation the spring 23 in the dummy shaft may be kept fully compressed by holding the reverse end of the tool as it is being slid out with the real shaft 29 from the other end. The parts may be made of any suitable metal such as malleable steel and the tool may be copper or chromium plated to prevent rust from affecting the tool.

I claim:

In a tool for use in assembling cluster gears in a transmission, said transmission including a case having registering openings therein, said tool adapted to extend through said openings and said tool comprising a cylindrical body member having a chamber extending inwardly from its outer end thereof, there being a socket in the other end of said body member, said socket being of less length than said chamber, there being a bore extending between said socket and chamber and being of less diameter than the latter, a support member mounted for movement towards and away from said body member, said support member having the same outside diameter as said body member, there being a cutout extending inwardly from the inner end of said support member, said support member having a threaded recess communicating with said cutout, said recess being of less diameter than said cutout, a pin having an enlarged head positioned in said chamber, a cylindrical shank extending from said head through said bore, socket and cutout and having a threaded portion arranged in threaded engagement with said recess, and a coil spring circumposed on said shank and having one end seated in said socket and its other end seated in said recess said coil spring being of greater diameter than said bore.

References Cited in the file of this patent

UNITED STATES PATENTS

| | | |
|---|---|---|
| 2,356,881 | Pollock | Aug. 29, 1944 |
| 2,570,618 | Werner | Oct. 9, 1951 |

FOREIGN PATENTS

| | | |
|---|---|---|
| 18,247 | Great Britain | Oct. 23, 1891 |